April 6, 1965 A. V. RICHARDSON 3,177,296

TELEPHONE DIALING DEVICE

Original Filed Dec. 4, 1959

INVENTOR.
Aloysius V. Richardson
BY Harold E. Cole
Attorney 3,177,296

TELEPHONE DIALING DEVICE

Aloysius Vincent Richardson, Medford, Mass., assignor to Charles V. Richardson, administrator of said Aloysius V. Richardson, deceased Continuation of application Ser. No. 857,446, Dec. 4, 1959. This application Nov. 22, 1961, Ser. No. 154,155
6 Claims. (Cl. 179—90)

This patent application is a continuation of my patent application, Serial No. 857,446, filing date December 4, 1959, now abandoned.

This invention relates to a device to rotate the apertured dial of an automatic telephone instrument.

In rotating a telephone dial many persons prefer to use a bare finger rather than a well-known knob that is attached to the end of a pencil or other article. However, frequent use of a bare finger often makes it tender or sore, or otherwise disables it. Accordingly, one object of my invention is to obtain the advantages of dialing without inconvenience to a person's finger, by providing a dialing knob that is close by, and directly controlled by a covered finger.

To attain the aforesaid object I provide a cover for a person's finger in the form of a finger receptable such as a flexible thimble, to which a separate dialing knob is closely connected.

Another object is to provide a protector for a person's finger that also serves to reinforce the finger receptacle to thereby firmly maintain the connection between said finger receptacle and dialing knob, yet permitting rotation of said knob.

A further object is to provide a minimum number of parts for my dialing device that can easily be assembled and disassembled, so that any worn or damaged part may easily be renewed.

The foregoing and other objects which will appear as the nature of the invention is better understood, may be accomplished by a construction and arrangement such as is disclosed by the drawing. The nature of the invention is such as to render it susceptible to various changes and modifications, and, therefore, I am not to be limited to the construction disclosed by the drawing, nor to the particular parts described in the specification; but am entitled to all such changes therefrom as fall within the scope of my claims.

Figure 1:
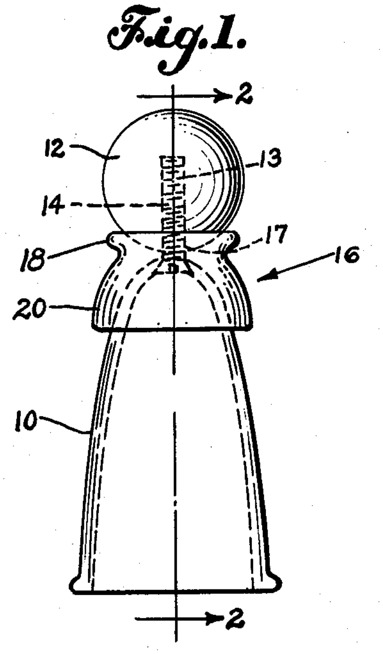
FIG. 1 is an elevational view of my telephone dialing device, shown enlarged.
Figure 2:
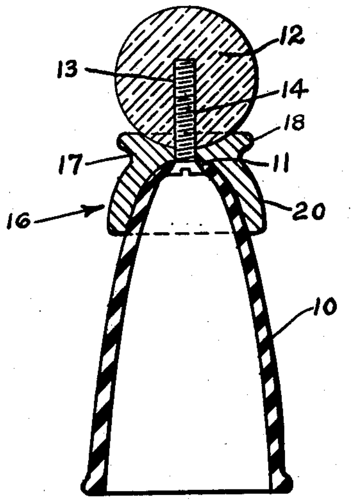
FIG. 2 is a sectional view taken on the line 2—2 of FIG. 1.
Figure 3:
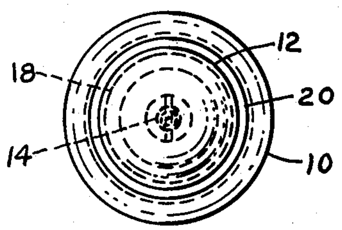
FIG. 3 is a plan view of said device looking into the finger receptacle.

As illustrated, my telephone dialing device has a finger receptacle 10 of rubber, plastic or other material having a small hole 11 therein at a reduced end thereof. Outside said finger receptacle 10 is a dialing knob 12 made of plastic, glass, metal or other preferably firm material and which has a screw-threaded, hole 13 therein. A screw 14 connects said finger receptacle 10 and dialing knob 12 together, all but its head extending through said hole 11 and screw-threadedly connecting with the threads in said hole 13.

A protector 16, preferably formed of firm material, such as plastic or hard rubber, is open at the top or outside where it has a collar portion 18 having a hole 17 therethrough to receive said screw 14 and preferably receives it rotatably. Said protector terminates in a skirt portion 20 that provides a relatively large opening to receive a portion of said finger receptacle 10.

Said knob and screw, being fixedly connected, may rotate together since said hole 11 permits this movement unless the screw is so positioned as to hold tight the connection between said receptacle 10 and said knob 12. Also said protector collar portion 18 preferably rotatably receives a portion of said knob 12. Said skirt portion 20 is preferably adhesively attached to said receptable 10 thereto.

A user of my device inserts his finger in said receptacle 10, and inserts said knob 12 into a finger opening in a telephone dial and then dials in the usual way.

What I claim is:

1. A dialing device comprising a finger receptacle, a knob, means fixed to said knob and connecting said receptacle and knob, and a protector outside of, and into which a portion of said knob rotatably enters and said receptacle enters.

2. A dialing device comprising a flexible finger receptacle, a knob of firm material, a connector member extending from said receptacle into and fixed to said knob, and a protector outside of, and into which a portion of said knob rotatably enters and said receptacle enters.

3. A dialing device comprising a flexible finger receptacle having a hole therethrough, a knob of firm material having a screw-threaded hole therein, a protector outside of, and into which a portion of said knob rotatably enters and said receptacle enters and having a hole therethrough, and a screw extending through said receptacle and protector holes and into screw-threaded engagement with said knob.

4. A dialing device comprising a finger receptacle having a hole therethrough at one end, a knob having a screw-threaded hole therein, a protector of firm material embodying a collar portion into which a portion of said knob enters and embodying a skirt portion that is larger than said collar portion and into which a portion of said receptacle enters, said protector having a hole therethrough, and a screw rotatably extending through said receptacle and protector holes and into screw-threaded engagement with said knob.

5. A dialing device comprising a flexible finger receptacle having a hole therethrough at one end, a knob of firm material having a screw-threaded hole therein that terminates at an intermediate portion thereof, a protector of firm material embodying a collar portion into which a portion of said knob enters rotatably and embodying a skirt portion that is larger than said collar portion and into which a portion of said receptacle enters and is fixed thereto, said protector having a hole therethrough at said collar portion, and a screw extending through said receptacle and protector holes and into screw-threaded engagement with said knob, said screw rotatably holding said knob connected to said receptacle whereby said knob is rotatable relative to said protector and finger receptacle.

6. A dialing device comprising a finger receptacle having a hole therethrough at one end, a knob having a screw-threaded hole therein, a protector of firm material embodying a collar portion at one end into which a portion of said knob rotatably enters and embodying a skirt at an opposite end into which a portion of said receptacle enters, said protector having a hole therethrough, and a screw rotatably extending through said receptacle and protector holes and into screw-threaded engagement with said knob.

References Cited in the file of this patent

UNITED STATES PATENTS

| | | |
|---|---|---|
| 1,794,233 | Hunter | Feb. 24, 1931 |
| 2,363,545 | Morehead | Nov. 28, 1944 |
| 2,418,638 | Hoover | Apr. 8, 1947 |
| 2,528,661 | Lynn et al. | Nov. 7, 1950 |
| 2,601,129 | Sams | June 17, 1952 |